(12) United States Patent
Kim

(10) Patent No.: US 6,930,150 B2
(45) Date of Patent: Aug. 16, 2005

US006930150B2

(54) METHOD FOR MAKING POLYMER MIXTURES AND COMPOSITIONS THEREOF

(75) Inventor: Hyun Jin Kim, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 35 days.

(21) Appl. No.: 10/231,901

(22) Filed: Aug. 29, 2002

(65) Prior Publication Data

US 2004/0044136 A1 Mar. 4, 2004

(51) Int. Cl.[7] ............... C08J 3/20; C08L 21/00; C08L 101/02
(52) U.S. Cl. .......... 525/192; 525/196; 525/197
(58) Field of Search .............. 525/192, 196, 525/197

(56) References Cited

U.S. PATENT DOCUMENTS

| | | | | |
|---|---|---|---|---|
| 4,056,269 | A | 11/1977 | Pollitt et al. | 273/218 |
| 4,185,831 | A | 1/1980 | Tominaga | 273/235 R |
| 4,235,980 | A | 11/1980 | Bateman | 525/215 |
| 4,468,499 | A | 8/1984 | Siegfried et al. | 525/301 |
| 4,670,522 | A | 6/1987 | Chen | 525/420.5 |
| 4,911,451 | A | 3/1990 | Sullivan et al. | 273/235 R |
| 4,984,803 | A | 1/1991 | Llort et al. | 273/235 R |
| 5,120,791 | A | 6/1992 | Sullivan | 525/196 |
| 5,250,589 | A * | 10/1993 | Keating et al. | 523/206 |
| 5,253,871 | A | 10/1993 | Viollaz | 273/228 |
| 5,255,922 | A | 10/1993 | Proudfit | 273/235 R |
| 5,298,571 | A | 3/1994 | Statz et al. | 525/330.2 |
| 5,300,587 | A | 4/1994 | Mascia et al. | 525/359.3 |
| 5,328,959 | A | 7/1994 | Sullivan | 525/196 |
| 5,359,000 | A | 10/1994 | Hamada et al. | 525/74 |
| 5,428,093 | A | 6/1995 | Lee | 524/317 |
| 5,451,522 | A | 9/1995 | Queener et al. | 435/252.3 |
| 5,610,236 | A | 3/1997 | Bonner | 525/185 |
| 5,834,546 | A | 11/1998 | Harris et al. | 524/320 |
| 6,042,489 | A | 3/2000 | Renard et al. | 473/374 |
| 6,124,389 | A | 9/2000 | Cavallaro et al. | 524/432 |
| 6,132,324 | A | 10/2000 | Hebert et al. | 473/378 |
| 6,140,498 | A | 10/2000 | Jumppanen et al. | 536/125 |
| 6,217,982 | B1 | 4/2001 | Dawson | 428/151 |
| 6,239,222 | B1 | 5/2001 | Nesbitt | 525/193 |
| 6,251,991 | B1 | 6/2001 | Takesue et al. | 525/66 |
| 6,271,305 | B1 | 8/2001 | Rajalingam et al. | 524/705 |
| 6,274,669 | B1 | 8/2001 | Rajagopalan | 525/64 |
| 6,300,398 | B1 | 10/2001 | Jialanella et al. | 524/275 |
| 6,300,419 | B1 | 10/2001 | Sehanobish et al. | 525/191 |
| 6,328,921 | B1 | 12/2001 | Marshall et al. | 264/279.1 |
| 6,329,463 | B1 | 12/2001 | Abraham et al. | 525/92 A |
| 6,355,715 | B1 | 3/2002 | Ladd et al. | 524/432 |
| 6,355,735 | B1 | 3/2002 | Wagner et al. | |
| 6,359,068 | B1 | 3/2002 | Moren et al. | 525/98 |
| 6,362,258 | B1 | 3/2002 | Avakian et al. | 524/100 |
| 6,368,236 | B1 | 4/2002 | Sullivan et al. | 473/377 |
| 6,369,125 | B1 | 4/2002 | Nesbitt | 522/142 |
| 6,371,869 | B1 | 4/2002 | Kato et al. | 473/365 |
| 6,380,303 | B1 | 4/2002 | Ogoe et al. | 525/67 |
| 6,391,807 | B1 | 5/2002 | Jariwala et al. | 442/327 |
| 6,399,710 | B1 | 6/2002 | Finerman et al. | 525/232 |
| 6,414,081 | B1 | 7/2002 | Ouhadi | 525/66 |
| 6,426,387 | B1 | 7/2002 | Kim | 525/236 |
| 6,579,939 | B2 * | 6/2003 | Ichikawa et al. | 525/89 |

* cited by examiner

*Primary Examiner*—Jeffrey Mullis
(74) *Attorney, Agent, or Firm*—Sheppard, Mullin, Richtor & Hampton LLP

(57) ABSTRACT

A method for making a polymer blend composition includes combining at least one component A incorporating at least five percent by weight of anionic functional groups in its structure, at least one component B, preferably free of such functional groups, and at least one component C, which is a metal cation. The method allows for greater flexibility in preparation of polymer compositions than methods previously known.

42 Claims, No Drawings

METHOD FOR MAKING POLYMER MIXTURES AND COMPOSITIONS THEREOF

BACKGROUND OF THE INVENTION

This invention relates generally to methods for making polymer compositions, and, more particularly, to methods for making polymer compositions providing for improved flexibility in preparation in comparison to methods previously known.

Polymers are ubiquitous in modern products, used in a wide variety of consumer and specialty goods, by many different industries, such as electronics, aerospace, automotive, medical and sports industries. A variety of polymer are available for use in these industries, including commodity plastics, engineering plastics, thermosets, elastomers, and rubbers. However, often no single polymer exists that is suitable for a given application, and it often is difficult and expensive to develop a suitable new polymer. As a result, polymers are combined to prepare a polymer alloy or blend having desirable properties suited to the particular industry or application of interest. The polymers blended for a given application are selected to provide for optimum properties in the finished product with respect to performance, cost, and ease of manufacture.

Typically, polymer blends are prepared by taking the base polymers in their finished form and mixing them using a variety of known dry-blending or melt-mixing techniques. The resulting compositions are then processed as necessary for use in the intended product. Common blending methods include taking the polymer components, typically in the form of solid pellets or powders, and dry-blending them to make a heterogeneous composition. This heterogenous composition can then be melt-processed using a molding machine to make the required finished good. Alternatively, the polymer composition can be melt-mixed using calendring mills, or any type of internal mixer, such as an extruder or Banbury mixer. In mixing these blends, care is taken to select a proper type and design of mixing system, as well as to control related processing parameters, such as temperature, torque, screw speeds, and feed rate to produce blends having desirable properties. These dry and melt-mixing processes can be used in a variety of configurations, based on convenience and on the requirements of the particular polymer blend.

A variety of polymer blends have been disclosed that exhibit different properties. Examples of these blends and the mixing techniques used for producing them are illustrated in numerous U.S. Patents, including: U.S. Pat. No. 4,670,522 to Chen (melt-mixing of polyamides and poly (ether-ester) elastomers); U.S. Pat. No. 5,300,587 to Maca et al. (blending a perfluoropolyether and a thermoplastic polymer); U.S. Pat. No. 5,451,522 to Boardman et al. (melt-mixing of fluorochemical piperazine compounds and a thermoplastic polymer); U.S. Pat. No. 5,610,236 to Bonner (premixing followed by extruding of polyvinylchloride and polyketone); U.S. Pat. No. 6,140,498 to Yamashita et al. (melt-mixing composition of block copolymer and rubber); U.S. Pat. No. 6,217,982 to Dawson (melt-mixing of ethylene/alkyl (meth)acrylate with a blend of polypropylene, ionomer, ethylene/glycidyl acrylate or methacrylate copolymer, and uncrosslinked ethylene propylene rubber); U.S. Pat. No. 6,300,419 to Sehanobish (dry-blending followed by melt-mixing of propylene polymer compositions); U.S. Pat. No. 6,300,398 to Jialanella et al. (dry-blending followed by melt-mixing of homogeneous ethylene polymer, a wax, and a nucleating agent); U.S. Pat. No. 6,359,068 to Moren et al. (dry-blending followed by melt-mixing of polypropylene and thermoplastic copolymer); U.S. Pat. No. 6,362,258 to Avakian et al. (mix-melting of polyolefin, silica, antioxidant, and a co-additive); U.S. Pat. No. 6,380,303 to Ogoe (dry-blending or melt-mixing of polycarbonates and rubber-modified copolymers); U.S. Pat. No. 6,391,807 to Jariwala et al. (melt-mixing of a fluorochemical oligomeric compound and a thermoplastic or thermoset polymer).

Additional examples of polymer blends include those in which compatabilizer is added to allow blending of incompatible polymers, such as those described in U.S. Pat. No. 5,428,093 to Lee al. (polyethylene blend compositions prepared using compatibilizer with low and high density polyethylene) and U.S. Pat. No. 6,414,081 to Ouhadi (compatibilized blends of non-polar thermoplastic elastomers and polar thermoplastic polymers). Also, polymer blends have been prepared to form either a fully interpenetrating network (two independent networks of the polymer components penetrating each other, but not covalently bonded to each other), or a semi-interpenetrating network (at least one polymer component forms a linear or branched polymer interspersed in the network structure of another of the polymer components). Examples of such blends are described in U.S. Pat. Nos. 6,271,305 to Rajalingam et al. (elastomeric polyurethane interpenetrating network compositions prepared by in situ reaction of polyols with different isocyanates and polyisocyanates in bituminous material) and U.S. Pat. No. 6,355,735 to Wagner et al. (semi-interpenetrating polymer networkformed from epoxy monomer, one olefin monomer forming a co-monomer mixture with the epoxy monomer, and catalytic palladium compound). Blends also are prepared to include thermoplastic vulcanizates (TPVs) such as those described in U.S. Pat. Nos. 6,399,710 to Finerman et al. (thermolastic vulcanizates modified with a thermoplastic random copolymer of ethylene) and U.S. Pat. No. 6,329,463 to Abraham et al. (high-temperature, oil-resistant thermoplastic vulcanizates made from polar plastics and acrylate or ethylene-acrylate elastomers).

Polymer blends are particularly common in sporting goods, including athletic shoes, skis and ski equipment, snowboards, skates and skating equipment, bicycle components, football equipment, hockey equipment, soccer equipment, protective body gear, protective eyewear, golf clubs, and golf balls. Golf balls, in particular, extensively utilize polymer blends. Golf balls generally are constructed to include a core, at least one cover layer surrounding the core, and optional intermediate layers between the core and cover. A variety of polymer resins and blends of these resins are used to prepare compositions for making these layers. These resins are selected to optimize various ball properties, including speed, spin rate, and durability as demonstrated by shear-cut resistance.

In particular, ball covers have been prepared from balata, transpolyisoprene ("synthetic balata"), thermoplastic polyurethane, thermoset polyurethane, and ionomer, or blends of these. Golf balls incorporating balata covers provide for a soft "feel" when hit and high spin rate, which improves ball controllability, but they also exhibit poor shear-cut resistance. Examples of golf ball covers incorporating balata and additional materials are disclosed in U.S. Pat. No. 4,984,803 to Llort et al. ("the Llort patent") and U.S. Pat. No. 5,255,922 to Proudfit ("the Proudfit patent"). The limitations of use of balata in covers with respect to poor shear-cut resistance are described in the Llort and Proudfit patents, as well as in U.S. Pat. No. 6,042,489 to Renard et al. and U.S. Pat. No. 6,368,236 to Sullivan et al.

To address the limitations of balata, other materials have been used in ball covers. For example, ball covers have been made incorporating high acid-content copolymeric ionomers, such as those disclosed in U.S. Pat. No. 5,298,571 to Statz et al. These covers provide for balls having superior durability and speed when hit, but they also provide poor "feel" and low spin rate. Covers also have been made from blends of copolymeric and terpolymeric ionomers, such as those disclosed in U.S. Pat. Nos. 5,120,791 and 5,328,959, both to Sullivan. These covers demonstrate improved feel and spin rate compared to those made only from copolymeric ionomers, and they exhibit reduced, but acceptable, shear-cut resistance and ball speed. However, use of these ionomers does not provide for complete flexibility. Ionomers exhibit ionic clustering, in which the metal cation-reacted functional groups cluster together due to the ionic attraction of the functional groups and the metal cations. This clustering is important in determining the physical properties and processability of the ionomers. However, ionomers as prepared have fixed levels of acid content and degree of reaction of the metal cation. As a result, the amount of ionic clustering in the particular ionomer, and the effect on properties of the ionomer, cannot readily be controlled.

In addition to use of balata and ionomers, covers also have incorporated thermoset polyurethane, such as is those disclosed in U.S. Pat. No. 6,132,324 to Hebert et al ("the Hebert patent"). Thermoset polyurethane covers provide good durability, feel, and spin rate, but these covers require complicated processing steps to mold the cover layer and to bring a full cure of the layer, as are described in the Hebert patent and in U.S. Pat. No. 6,328,921 to Marshall et al. Use of thermoplastic, rather than thermoset polyurethane, is described in, for example, U.S. Pat. No. 6,251,991 to Takasue et al. U.S. Pat. No. 6,369,125 to Nesbitt. Covers incorporating thermoplastic polyurethane provide for good feel, spin rate, and greater processability than thermoset polyurethane, but at the cost of poor shear-cut resistance. Also, the processing window (i.e., the range of suitable conditions for processing of the material) for thermoplastic polyurethane generally is narrower than for other thermoplastics used in making golf ball layers, leading to difficulties in manufacture.

Yet another approach for making golf ball cover compositions is to blend copolymeric or terpolymeric ionomers with elastomers. Such cover blends are disclosed in, for example, U.S. Pat. No. 6,371,869 to Kato et al. These blends provide good feel and high spin rate but, like blends of copolymeric and terpolymeric ionomers, they also provide for low shear-cut resistance and reduced ball speed. Additionally, blends of ionomers and elastomers can exhibit incompatibility between these components, leading to deterioration of ball performance and the need to use compatibilizers. Use of compatibilizers is described in patents discussed above, and also in, for example, U.S. Pat. No. 6,274,669 to Rajagopalan (golf ball covers incorporating ionomer blended with non-ionomer and compatibilizer).

Besides their use in ball covers, polymer blends also are used in golf ball cores, and in intermediate layers in multilayer golf balls. The composition and resulting mechanical properties of the core are important in determining the ball's coefficient of restitution (C.O.R.), i.e., the ratio of the ball's post-impact to pre-impact speed, and its PGA compression, i.e., a measure of the deflection on the surface of the ball when a standard force is applied. A high C.O.R. improves ball speed and distance when hit, and generally, a high C.O.R. is achieved by having a high PGA compression. Golf ball cores generally are made from blends incorporating polybutadiene rubber. A number of patents discuss polymer blends for use in golf ball cores. For example, U.S. Pat. No. 6,239,222 to Nesbitt discloses cores comprising polybutadiene rubber and polypropylene powder resins. Also, U.S. Pat. No. 5,834,546 to Harris et al. discloses cores comprising polybutadiene rubbers and oxa acids, and U.S. Pat. No. 6,426,387 to Kim discloses cores comprising cobalt-catalyzed polybutadiene rubber having specified material properties. Many different compositions are used, either of multiple polybutadiene rubbers, or of rubbers with other compounds, to prepare ball cores having optimal properties.

The composition of intermediate layers is important in determining the ball's spin rate and controllability. These intermediate layers often are made using soft or hard ionomeric resins, elastomeric resins, or blends of these, similar to those used in cover layers. Like blends for golf ball covers, polymer blends for cores and intermediate layers are prepared generally by dry-blending and/or melt-mixing of the component polymers, along with any required additives or fillers. Examples of polymer blend compositions for intermediate layers are described in a number of patents, including U.S. Pat. No. 6,355,715 to Ladd, which describes an intermediate layer comprising polyether-type polyurethane and a second thermoplastic component, such as a block copolymer, dynamically vulcanized thermoplastic elastomer, or other listed components. Also, U.S. Pat. No. 5,253,871 to Viollaz describes intermediate layer compositions incorporating amide block copolyether and ionomer, and U.S. Pat. No. 6,124,389 to Cavallaro et al. describes intermediate layer compositions incorporating an ethylene methacrylic/acrylic acid copolymer and other specified thermoplastic components.

As discussed above, additional examples exist of use of blends of polymers in a variety of goods, prepared using a number of known techniques. Despite this wide variety, blending of these polymers has a number of disadvantages. Processing of the polymers can be difficult because of poor processability of selected polymers. Also, incompatibility of different polymers can lead to phase separation of the base polymers in the blend, with resulting deterioration of blend properties. Also, despite the wide array of available polymers, tailoring polymers to be used in blends to have optimum properties can be difficult. Any attempt to create a blend to meet a specific set of criteria is limited by the available materials and available methods for forming these materials. That is, despite the wide variety of polymer blends known, there continues to be a lack of ease and flexibility in preparing tailored polymer blends.

In view of the above, it is apparent that a need exists for improved methods for preparing polymer blends that provide for good processability, and tailoring of blend properties. The present invention fulfills this need and other needs, and provides further related advantages.

SUMMARY OF THE INVENTION

The present invention resides in a method for making a polymer blend composition incorporating steps of: 1) blending together at least one Component A that is a monomer, oligomer, prepolymer, or polymer having at least 5% by weight of anionic functional groups selected from the group consisting of sulfonic acid, phosphoric acid, and carboxylic acid, at least one Component B that is an oligomer, prepolymer or polymer having less by weight of anionic functional groups than the weight percentage of anionic functional groups of Component A, and at least one Component C that is a metal cation, to form a first composition, and 2) melt-processing the first composition to produce a reaction product of the anionic functional groups of Component A and Component C to form the polymer blend composition. The present invention also resides in polymer blend compositions that are the reaction products resulting from these methods.

In the method of the invention, Component A preferably incorporates between about 5% and about 50% by weight of anionic functional groups, and Component B preferably comprises less than about 25% by weight of anionic functional groups, more preferably less than 20%, more preferably less than 10%, and most preferably free of the groups.

In the method of the invention, Component A can incorporate homopolymer, copolymer, terpolymer, or mixtures of these. A preferred copolymer incorporates an α-olefin having the form $RCH=CH_2$, where R is a radical selected from the class consisting of hydrogen and alkyl radicals having 1 to 8 carbon atoms, and an α-β-ethylenically unsaturated carboxylic acid having preferably 3 to 8 carbon atoms. Preferred α-olefins of the copolymer include ethylene, propylene, butene, pentene, hexene, heptene, methylbutene, or methylpentene. Preferred α-β-ethylenically unsaturated carboxylic acids of the copolymer include acrylic acid, methacrylic acid, ethacrylic acid, itaconic acid, maleic acid, or fumaric acid, and it can also be a monoester of dicarboxylic acid, such as methyl hydrogen maleate, methyl hydrogen fumarate, ethyl hydrogen fumarate, or maleic anhydride. A preferred terpolymer for Component A incorporates an α-olefin having the form $RCH=CH_2$, where R is a radical selected from the class consisting of hydrogen and alkyl radicals having 1 to 8 carbon atoms, an a-p-ethylenically unsaturated carboxylic acid having preferably 3 to 8 carbon atoms, and an acrylate ester having from 1 to 21 carbon atoms.

In the method of the present invention, Component B preferably incorporates a triblock copolymer having: (a) a first polymer block comprising an aromatic vinyl compound; (b) a second polymer block comprising a diene compound; and (c) a hydroxyl group located at a block copolymer, or a hydrogenation product of this triblock copolymer, or mixtures of these. Component C preferably incorporates lithium, sodium, magnesium, aluminum, potassium, calcium, manganese, tungsten, titanium, iron, cobalt, nickel, hafnium, copper, zinc, barium, zirconium, or tin in the form of a metal salt, such as metal hydroxide, metal carbonate, metal acetate, or mixtures of these. The first composition discussed above also can incorporate crosslinking agents, co-crosslinking agents, accelerators, activators, ultraviolet-active chemicals, electron beam-active chemicals, colorants, ultraviolet stabilizers, optical brighteners, antioxidants, processing aids, mold release agents, foaming agents, fillers, fibers, or mixtures of these. In addition to the materials described above, polymer blend compositions produced using the method of the present invention can incorporate a copolymer or terpolymer having in its structure a glycidyl, hydroxyl, maleic anhydride, or carboxylic group.

In preferred aspects of the method of the present invention, the step of blending together incorporates dry-mixing together Components A, B, and C to form the first composition. Additionally, the step of blending together can incorporate dry-mixing together Components A and B to produce a first mixture, melt-mixing the first mixture, and dry-mixing into the first mixture Component C. With either approach, the step of melt-processing the first composition preferably incorporates using an extruder for melt-mixing the first composition, either once or more than once.

In preferred aspects of the method of the present invention, the first composition preferably incorporates between about 1% and about 99% by weight of Component A based on the combined weight of component A and component B, more preferably between about 10% and about 90%, more preferably between about 20% and about 80%, and most preferably between about 30% and about 70%. Preferably, the step of melt-processing incorporates reacting greater than about 5% of the anionic functional groups in Component A with Component C, more preferably between about 10% and about 90%, more preferably between about 10% and about 80%, and most preferably between about 10% and about 70%.

The present invention also resides in a sporting good incorporating a polymer blend composition prepared using a method as described above. The sporting good can be, for example, an athletic shoe, ski, ski boot, snowboard, skate, bicycle, football, hockey mask, hockey club, soccer ball, protective body gear, protective eyewear, golf club, or golf ball. In particular, a golf ball can incorporate a polymer blend composition prepared using a method as described above in its core, cover, or intermediate layer. These golf balls can have a variety of configurations, including multiple or liquid cores, or rubber thread (i.e., wound) layers.

Other features and advantages of the present invention should become apparent from the following detailed description of the preferred embodiments.

DESCRIPTION OF THE PREFERRED EMBODIMENTS

The present invention resides in a method for making polymer compositions incorporating an in-situ reaction process to produce a psuedo-crosslinked polymer network. The present method also resides in compositions produced using the method, and golf balls incorporating the compositions.

In the method, a composition is prepared by blending together at least three materials, identified as Components A, B, and C, and melt-processing these components to form in-situ a polymer blend composition incorporating a psuedo-crosslinked polymer network. Component A is a monomer, oligomer, prepolymer or polymer that incorporates at least five percent by weight of at least one type of an anionic functional group, and more preferably between about 5% and 50% by weight. Component B is a monomer, oligomer, or polymer that incorporates less by weight of anionic functional groups than does Component A, Component B preferably incorporates less than about 25% by weight of anionic functional groups, more preferably less than about 20% by weight, more preferably less than about 10% by weight, and most preferably Component B is free of anionic functional groups. Component C incorporates a metal cation, preferably as a metal salt. The pseudo-crosslinked network structure is formed in-situ, not by covalent bonds, but instead by ionic clustering of the reacted functional groups of Component A. The method can incorporate blending together more than one of any of Components A, B, or C.

The polymer blend composition resulting from the method of the present invention can include either Component A or B dispersed in a phase of the other. Preferably, the methods of the present invention incorporate blending together compositions comprising between about 1% and about 99% by weight of Component A based on the combined weight of Components A and B, more preferably between about 10% and about 90%, more preferably between about 20% and about 80%, and most preferably, between about 30% and about 70%. Component C is present in a quantity sufficient to produce the preferred amount of reaction of the anionic functional groups of Component A after sufficient melt-processing. Preferably, after melt-processing at least about 5% of the anionic functional groups in the chemical structure of Component A have been consumed, more preferably between about 10% and about 90%, more preferably between about 10% and about 80%, and most preferably between about 10% and about 70%.

The blend of these components is melt-processed to produce a reaction product of the anionic functional groups of Component A with the metal cation Component C to form in-situ a composition incorporating a pseudo-crosslinked network of Component A in the presence of Component B. The method of the present invention allows for preparation of polymer blends in which the amount of ionic clustering of the functional groups (as discussed above with respect to ionomers) can be controlled as necessary for optimum properties of the blend. In the composition, Component A produces pseudo-crosslinking at the ionic clusters formed in-situ by the clustering of the anionic functional groups reacted with metal cation. Because of the in-situ formation of these clusters in the presence of Component B, and the resulting pseudo-crosslinks, an interpenetrating network is produced.

The composition preferably is prepared by mixing the above materials into each other thoroughly, either by using a dispersive mixing mechanism, a distributive mixing mechanism, or a combination of these. These mixing methods are well known in the manufacture of polymer blends. As a result of this mixing, the anionic functional group of Component A is dispersed evenly throughout the mixture.

Next, reaction is made to take place in-situ at the site of the anionic functional groups of Component A with Component C in the presence of Component B. This reaction is prompted by addition of heat to the mixture. The reaction results in the formation of ionic clusters in Component A and formation of a pseudo-crosslinked structure of Component A in the presence of Component B. Depending upon the structure of Component B, this pseudo-crosslinked Component A can combine with Component B to form a variety of interpenetrating network structures. For example, the materials can form a pseudo-crosslinked network of Component A dispersed in the phase of Component B, or Component B can be dispersed in the phase of the pseudo-crosslinked network of Component A. Component B may or may not also form a network, depending upon its structure, resulting in either: a fully-interpenetrating network, i.e., two independent networks of Components A and B penetrating each other, but not covalently bonded to each other; or, a semi-interpenetrating network of Components A and B, in which Component B forms a linear, grafted, or branched polymer interspersed in the network of Component A. For example, a reactive functional group or an unsaturation in Component B can be reacted to form a crosslinked structure in the presence of the in-situ-formed, psuedo-crosslinked structure of component A, leading to formation of a fully-interpenetrating network. Any anionic functional groups in Component B also can be reacted with the metal cation of Component C, resulting in pseudo-crosslinking via ionic cluster attraction of Component A to Component B.

The method of the present invention is in contrast to known methods for producing polymer blends. As discussed above, current practice generally involves simply mixing polymers to form a blend. This mixing does not allow for preparation of the wide range of materials and target properties of compositions provided by the method of the present invention. In particular, the level of in-situ-formed pseudo-crosslinking in the compositions formed by the present methods can be controlled as desired by selection and ratio of Components A and B, amount and type of anionic functional group, amount and type of metal cation in Component C, type and degree of chemical reaction in Component B, and degree of pseudo-crosslinking produced of Components A and B. Prior art methods for making polymer blends do not provide for the wide flexibility in processing provided by the present method. The method of the present invention also allows for ease of formation of compositions that would be impossible or difficult to prepare using blending of conventional polymers, including ionomers.

As discussed above, the mechanical and thermal properties of the polymer blend resulting from the method of the present invention can be controlled as required by a modifying any of a number of factors, including: chemical structure of Components A and B, particularly the amount and type of anionic functional groups; mean molecular weight and molecular weight distribution of Components A and B; linearity and crystallinity of Components A and B; type of metal cation in component C; degree of reaction achieved between the anionic functional groups and the metal cation; mix ratio of Component A to Component B; type and degree of chemical reaction in Component B; presence of chemical reaction, such as a crosslinking reaction, between Components A and B; and, the particular mixing methods and conditions used.

A variety of suitable materials exist for use with the method of the present invention. As discussed above, Component A can be any monomer, oligomer, prepolymer, or polymer incorporating at least 5% by weight of anionic functional groups. Those anionic functional groups can be incorporated into monomeric, oligomeric, prepolymeric, or polymeric structures during the synthesis of Component A, or they can be incorporated into a pre-existing monomer, oligomer, prepolymer, or polymer through sulfonation, phosphonation, or carboxylation to produce Component A.

Examples of suitable materials for use as Component A include, but are not limited to, sulfonated, phosphonated, or carboxylated products of the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyurethane, polyarylate, polyacrylate, polyphenyl ether, modified-polyphenyl ether, high-impact polystyrene, diallyl phthalate polymer, acrylonitrile-styrene-butadiene (ABS), styrene-acrylonitrile (SAN) (including olefin-modified SAN and acrilonitrile styrene acrylonitrile), styrene-maleic anhydryde (S/MA) polymer, styrenic copolymer, functionalized styrenic copolymer, functionalized styrenic terpolymer, styrenic terpolymer, cellulose polymer, liquid crystal polymer (LCP), ehtylene-propylene-diene terpolymer (EPDM), ethylene-propylene coplymer, ethylene vinyl acetate, polyurea, and polysiloxane, or any metallocene-catalyzed polymers of these species.

Particularly suitable polymers for use as Component A within the scope of the present invention include sulfonated, phosphonated, or carboxylated products of the following: polyethyleneterephthalate, polybutyleneterephthalate, polytrimethyleneterephthalate, ethylene-carbon monoxide copolymer, polyvinyldiene fluorides, polyphenylenesulfide, polypropyleneoxide, polyphenyloxide, polypropylene, functionalized polypropylene, polyethylene, ethylene-octene copolymer, ethylene-methyl acrylate, ethylene-butyl acrylate, polycarbonate, polysiloxane, functionalized polysiloxane, copolymeric ionomer, terpolymeric ionomer, polyetherester elastomer, polyesterester elastomer, polyetheramide elastomer, propylene-butadiene copolymer, modified copolymer of ethylene and propylene, styrenic copolymer (including styrenic block copolymer and randomly distributed styrenic copolymer, such as styrene-isobutylene copolymer and styrene-butadiene copolymer), partially or fully hydrogenated styrene-butadiene-styrene block copolymers such as styrene-(ethylene-propylene)-styrene or styrene(ethylene-butylene)-styrene block copolymers, partially or fully hydrogenated styrene-butadiene-styrene block copolymers with functional group, polymers based on ethylene-propylene-(diene), polymers based on functionalized ethylene-propylene (diene), dynamically vulcanized polypropylene/ethylene-propylenediene-copolymer, thermoplastic vulcanizates based on ethylene-propylene-(diene), thermoplastic polyetherurethane, thermoplastic polyesterurethane, compositions for making thermoset polyurethane, thermoset polyurethane, natural rubber, styrene-butadiene rubber, nitrile rubber, chloroprene rubber, fluorocarbon rubber, butyl rubber, acrylic rubber, silicone rubber, chlorosulfonated polyethylene, polyisobutylene, alfin rubber, polyester rubber, epichlorphydrin rubber, chlorinated isobutylene-isoprene rubber, nitrile-isobutylene rubber, 1,2-polybutadiene, 1,4-polybutadiene, cis-polyisoprene, trans-polyisoprene, and polybutylene-octene, or any metallocene-catalyzed polymers of the above-listed species. Suitable polyamides for sulfonation, phosphonation, or carboxylation are products of the following include resins obtained by: (1) polycondensation of (a) a dicarboxylic acid, such as oxalic acid, adipic acid, sebacic acid, terephthalic acid, isophthalic acid or 1,4-cyclohexylidicarboxylic acid, with (b) a diamine, such as ethylenediamine, tetramethylenediamine, pentamethylenediamine, hexamethylene-diamine or decamethylenediamine, 1,4-cyclohexyldiamine or m-xylylenediamine; (2) a ring-opening polymerization of cyclic lactam, such as e-caprolactam; (3) polycondensation of an aminocarboxylic acid, such as 6-aminocaproic acid, 9-aminononaoic acid, 11-aminoudecanoic acid or 12-aminododecanoic acid; or, (4) copolymerization of a cyclic lactam with a dicarboxylic acid and a diamine. Specific examples of suitable polyamides for sulfonation, phosphonation, or carboxylation include Nylon 6, Nylon 66, Nylon 610, Nylon 11, Nylon 12, copolymerized Nylon, Nylon MXD6, and Nylon 46.

Examples of suitable materials for use as Component A include homopolymers, copolymers, and terpolymers. A preferred copolymer is a copolymer of: an α-olefin having the form $RCH=CH_2$, where R is a radical selected from the class consisting of hydrogen and alkyl radicals having 1 to 8 carbon atoms; and, an α-β-ethylenically unsaturated carboxylic acid having preferably 3 to 8 carbon atoms. Examples of suitable olefins in this copolymer include ethylene, propylene, butene, pentene, hexene, heptene, methylbutene, and methylpentene. Examples of suitable α-β-ethylenically unsaturated carboxylic acids in this copolymer include: acrylic acid, methacrylic acid, ethacrylic acid, itaconic acid, maleic acid, fumaric acid, monoesters of dicarboxylic acid (such as methyl hydrogen maleate, methyl hydrogen fumarate, and ethyl hydrogen fumarate, and maleic anhydride), and α-β-monoethylenically unsaturated anhydrides of carboxylic acid. A preferred terpolymer is a terpolymer of: an α-olefin having the form $RCH=CH_2$, where R is a radical selected from the class consisting of hydrogen and alkyl radicals having 1 to 8 carbon atoms; an α-β-ethylenically unsaturated carboxylic acid having preferably 3 to 8 carbon atoms; and an acrylate ester having from 1 to 21 carbon atoms.

Preferred, but non-limiting, examples of suitable copolymers and terpolymers for use with the present invention include copolymers or terpolymers of: ethylene/acrylic acid, ethylene/methacrylic acid, ethylene/itaconic acid, ethylene/methyl hydrogen maleate, ethylene/maleic acid, ethylene/methacrylic acid/ethylacrylate, ethylene/itaconic acid/methyl metacrylate, ethylene/methyl hydrogen maleate/ethyl acrylate, ethylene/methacrylic acid/vinyl acetate, ethylene/acrylic acid/vinyl alcohol, ethylene/propylene/acrylic acid, ethylene/styrene/acrylic acid, ethylene/methacrylic acid/acrylonitrile, ethylene/funaric acid/vinyl methyl ether, ethylene/vinyl chloride/acrylic acid, ethylene/vinyldiene chloride/acrylic acid, ethylene/vinyl fluoride/methacrylic acid, and ethylene/chlorotrifluoroethylene/methacrylic acid, or any metallocene-catalyzed polymers of the above-listed species. Examples of suitable copolymers for use with the present invention are marketed under the name PRIMACOR by Dow Chemical Company of Midland Mich.

Additional examples of materials suitable for use as Component A in the method of the present invention include the reaction products of compositions incorporating diisocyanate, diamine, polyamine, or polyol incorporating the anionic functional groups discussed above, as well as any combination of those reaction products, such as prepolymers or polymers incorporating these anionic functional groups. Further examples of materials suitable for use as Component A include oxa acids, oxa esters, or polymers incorporating oxa acids or oxa esters as a comonomer. Particular examples of suitable oxa acids and their ester include: 3,6-dioxaheptanoic acid, 3,6,9-trioxadecanoic acid, 3,6,9-trioxaudecanedioic acid, 3,6,9-trioxaudecanedioic ester, polyglycol diacid, and polyglycol diacid ester.

As discussed above, Component B can be any monomer, oligomer, or polymer, preferably having a lower weight percentage of anionic functional groups than that present in Component A in the weight ranges discussed above, and most preferably free of such functional groups. Examples of suitable materials for Component B include, but are not limited to, the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyurethane, polyarylate, polyacrylate, polyphenyl ether, modified-polyphenyl ether, high-impact polystyrene, diallyl phthalate polymer, metallocene catalyzed polymers, acrylonitrile-styrene-butadiene (ABS), styrene-acrylonitrile (SAN) (including olefin-modified SAN and acrilonitrile styrene acrylonitrile), styrene-maleic anhydryde (S/MA) polymer, styrenic copolymer, functionalized styrenic copolymer, functionalized styrenic terpolymer, styrenic terpolymer, cellulose polymer, liquid crystal polymer (LCP), ehtylene-propylene-diene terpolymer (EPDM), ethylene-propylene coplymer, ethylene vinyl acetate, polyurea, and polysiloxane or any metallocene-catalyzed polymers of these species. Particularly suitable polymers for use as Component B within the scope of the present invention include polyethylene-terephthalate, polybutyleneterephthalate, polytrimethylene-terephthalate, ethylene-carbon monoxide copolymer, polyvinyldiene fluorides, polyphenylenesulfide, polypropyleneoxide, polyphenyloxide, polypropylene, functionalized polypropylene, polyethylene, ethylene-octene copolymer, ethylene-methyl acrylate, ethylene-butyl acrylate, polycarbonate, polysiloxane, functionalized polysiloxane, copolymeric ionomer, terpolymeric ionomer, polyetherester elastomer, polyesterester elastomer, polyetheramide elastomer, propylene-butadiene copolymer, modified copolymer of ethylene and propylene, styrenic copolymer (including styrenic block copolymer and randomly distributed styrenic copolymer, such as styrene-isobutylene copolymer and styrene-butadiene copolymer), partially or fully hydrogenated styrene-butadiene-styrene block copolymers such as styrene-(ethylene-propylene)-styrene or styrene(ethylene-butylene)-styrene block copolymers, partially or fully hydrogenated styrene-butadiene-styrene block copolymers with functional group, polymers based on ethylene-propylene-(diene), polymers based on functionalized ethylene-propylene-(diene), dynamically vulcanized polypropylene/ethylene-propylenediene-copolymer, thermoplastic vulcanizates based on ethylene-propylene-(diene), thermoplastic polyetherurethane, thermoplastic polyesterurethane, compositions for making thermoset polyurethane, thermoset polyurethane, natural rubber, styrene-butadiene rubber, nitrile rubber, chloroprene rubber, fluorocarbon rubber, butyl rubber, acrylic rubber, silicone rubber, chlorosulfonated polyethylene, polyisobutylene, alfin rubber, polyester rubber, epichlorphydrin rubber, chlorinated isobutylene-isoprene rubber, nitrile-isobutylene rubber, 1,2-polybutadiene, 1,4-polybutadiene, cis-polyisoprene, trans-polyisoprene, and polybutylene-octene.

Suitable polyamides for use as component B in the method of the present invention include resins obtained by: (1) polycondensation of (a) a dicarboxylic acid, such as oxalic acid, adipic acid, sebacic acid, terephthalic acid, isophthalic acid or 1,4-cyclohexylidicarboxylic acid, with (b) a diamine, such as ethylenediamine, tetramethylenediamine, pentamethylenediamine, hexamethylenediamine or decamethylenediamine, 1,4-cyclohexyldiamine or m-xylylenediamine; (2) a ring-opening polymerization of cyclic lactam, such as ε-caprolactam or co-laurolactam; (3) polycondensation of an aminocarboxylic acid, such as 6-aminocaproic acid, 9-aminononaoic acid, 11-aminoudecanoic acid or 12-aminododecanoic acid; or, (4) copolymerization of a cyclic lactam with a dicarboxylic acid and a diamine. Specific examples of suitable polyamides include Nylon 6, Nylon 66, Nylon 610, Nylon 11, Nylon 12, copolymerized Nylon, Nylon MXD6, and Nylon 46. Preferred materials for use as Component B in the present invetion also include polyester elastomers marketed under the name SKYPEL by SK Chemicals of South Korea, or triblock copolymers marketed under the name HG-252 by Kuraray Corporation of Kurashiki, Japan. These triblock copolymers have at least one polymer block comprising an aromatic vinyl compound and at least one polymer block comprising a conjugated diene compound, and a hydroxyl group at a block copolymer.

As stated above, Component C is a metal cation. These metals are from groups IA, IB, IIA, IIB, IIIA, IIIB, IVA, IVB, VA, VB, VIA, VIB, VIIB and VIIIB of the periodic table. Examples of these metals include lithium, sodium, magnesium, aluminum, potassium, calcium, manganese, tungsten, titanium, iron, cobalt, nickel, hafnium, copper, zinc, barium, zirconium, and tin. Suitable metal compounds for use as a source of Component C are, for example, metal salts, preferably metal hydroxides, metal carbonates, or metal acetates. In addition to Components A, B, and C, other materials commonly used in polymer blend compositions, can be incorporated into compositions prepared using the method of the present invention, including: crosslinking agents, co-crosslinking agents, accelerators, activators, UV-active chemicals such as UV initiators, EB-active chemicals, colorants, UV stabilizers, optical brighteners, antioxidants, processing aids, mold release agents, foaming agents, and organic, inorganic or metallic fillers or fibers, including fillers to adjust specific gravity.

Various known methods are suitable for preparation of polymer blends as part of the method of the present invention. For example, the three components can be premixed together in any type of suitable mixer, such as a V-blender, tumbler mixer, or blade mixer. This premix then can be melt-processed using an internal mixer, such as Banbury mixer, roll-mill or combination of these, to produce a reaction product of the anionic functional groups of Component A by Component C in the presence of Component B. Alternatively, the premix can be melt-processed using an extruder, such as single screw, co-rotating twin screw, or counter-rotating twin screw extruder, to produce the reaction product. The mixing methods discussed above can be used together to melt-mix the three components to prepare the compositions of the present invention. Also, the components can be fed into an extruder simultaneously or sequentially.

Most preferably, Components A and B are melt-mixed together without Component C, with or without the premixing discussed above, to produce a melt-mixture of the two components. Then, Component C separately is mixed into the blend of Components A and B. This mixture is melt-mixed to produce the reaction product. This two-step mixing can be performed in a single process, such as, for example, an extrusion process using a proper barrel length or screw configuration, along with a multiple feeding system. In this case, Components A and B can be fed into the extruder through a main hopper to be melted and well-mixed while flowing downstream through the extruder. Then, Component C can be fed into the extruder to react with the mixture of Components A and B at a downstream feeding port. Reaction between the melt-mixture of Components A and B and Component C occurs between the feeding port and the die section. The final polymer composition then exits from the die. If desired, any extra steps of melt-mixing can be added to either approach of the method of the present invention to provide for improved mixing or completion of the reaction between A and C. Also, additional components discussed above can be incorporated either into a premix, or at any of the melt-mixing stages. Alternatively, Components A, B, and C can be melt-mixed simultaneously to form in-situ a psuedo-crosslinked structure of Component A in the presence of Component B, either as a fully or semi-interpenetrating network.

The method of the present invention can be used to produce consumer or specialty goods in a wide variety of areas in which polymer blends are used, such as aerospace, electronics, apparel, packaging, automobiles, and sporting goods, such as those previously discussed. In particular, the method can be used to prepare golf ball layer compositions for use in a variety of ball constructions, such as multi-layer balls, balls having multi-layer or liquid balls, and balls having wound layers. Golf ball compositions produced can be tailored to vary or to optimize a number of golf ball performance properties, while retaining durability of the ball layers and ease of manufacturing.

Golf balls and ball compositions prepared using the method of the present invention additionally can include copolymers or terpolymers having a glycidyl group, hydroxyl group, maleic anhydride group or carboxylic group. These copolymers and terpolymers comprise an α-olefin. Examples of suitable α-olefins include ethylene, propylene, 1-butene, 1-pentene, 3-methyl-1-butene, 1-hexene, 4-methyl-1-petene, 3-methyl-1-pentene, 1-octene, 1-decene, 1-dodecene, 1-tetradecene, 1-hexadecene, 1-octadecene, 1-eicocene, 1-docoene, 1-tetracocene, 1-hexacocene, 1-octacocene, and 1-triacontene. One or more of these α-olefins may be used. Examples of suitable glycidyl groups in copolymers or terpolymers for use within the scope of the present invention include esters and ethers of aliphatic glycidyl, such as allylglycidylether, vinylglycidylether, glycidyl maleate and itaconatem glycidyl acrylate and methacrylate, and also alicyclic glycidyl esters and ethers, such as 2-cyclohexene-1-glycidylether, cyclohexene-4,5-diglyxidylcarboxylate, cyclohexene-4-glycidyl carobxylate, 5-norboenene-2-methyl2-glycidyl carboxylate, and endocis-bicyclo(2,2,1)-5-heptene-2,3-diglycidyl dicaroboxylate. These polymers having a glycidyl group may comprise other monomers, such as esters of unsaturated carboxylic acid, for example, alkyl(meth) acrylates or vinyl esters of unsaturated carboxylic acids. Polymers having a glycidyl group can be obtained by copolymerization or graft polymerization with homopolymers or copolymers. Examples of suitable terpolymers having a glycidyl group include LOTADER AX8900 and LOTADER AX8920 marketed by Elf-Atochem Company, ELVALOY marketed by Du Pont, REXPEARL marketed by Nippon Petrochemicals Co., Ltd. Additional examples of copolymers comprising epoxy monomers and which are suitable for use in compositions prepared using the method of the present invention include styrene-butadiene-styrene block copolymers in which the polybutadiene block contains epoxy group, and styrene-isoprene-styrene block copolymers in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd.

Examples of polymers or terpolymers incorporating a maleic anhydride group suitable for use within compositions prepared using the method of the present invention include maleic anhydride-modified ethylene-propylene copolymers, maleic anhydride-modified ethylene-propylene-diene terpolymers, maleic anhydride-modified polyethylenes, maleic anhydride-modified polypropylenes, ethylene-ethylacrylate-maleic anhydride terpolymers, and maleic anhydride-indene-styrene-cumarone polymers. Examples of commercially available copolymers incorporating maleic anhydride include: BONDINE, marketed by Sumitomo Chemical Co., such as BONDINE AX8390, an ethylene-ethyl acrylate-maleic anhydride terpolymer having a combined ethylene acrylate and maleic anhydride content of 32% by weight, and BONDINE TX TX8030, an ethylene-ethyl acrylate-maleic anhydride terpolymer having a combined ethylene acrylate and maleic anhydride content of 15% by weight and a maleic anhydride content of 1% to 4% by weight; maleic anhydride-containing LOTADER 3200, 3210, 6200, 8200, 3300, 3400, 3410, 7500, 5500, 4720, and 4700, marketed by Elf-Atochem; EXXELOR VA1803, a maleic anyhydride-modified ethylene-propylene copolymer having a maleic anyhydride content of 0.7% by weight, marketed by Exxon Chemical Co.; and KRATON FG 1901x, a maleic anhydride functionalized triblock copolymer having polystyrene endblocks and poly(ethylene/butylene) midblocks, marketed by Shell Chemical.

EXAMPLES

The method of the present invention was used in a number of Examples to produce polymer blends. The particular Examples are discussed in detail below.

Example 1

This Example illustrates an aspect of the method of the present invention incorporating mixing of all three components together, prior to any melt processing. A blend was prepared comprising 50% by weight of PRIMACOR 5980Icopolymer as Component A and 50% by weight of SKYPEL G130D polyester elastomer as Component B. To this blend, $Mg(OH)_2$, a source of magnesium cation (Component C), was added in an amount sufficient to provide for reaction of 50% of the anionic functional groups of the PRIMACOR, and the three components were dry blended. Next, the dry-blended mixture was melt-mixed using twin-screw extrusion to produce a polymer alloy, designated Blend 1.1, in which 50% of the anionic functional groups were reacted. Any volatile fraction produced during extrusion was removed from the extruder under vacuum. Blend 1.1 was then reextruded to produce an alloy designated Blend 1.2. Blend 1.2 was itself reextruded to produce an alloy designated Blend 1.3.

Example 2

This Example illustrates an aspect of the method of the present invention incorporating melt-mixing of Components A and B together without any premixing, followed by addition of the cation and melt-mixing. A blend was prepared comprising 20% by weight of PRIMACOR 5980Icopolymer and 80% by weight of SKYPEL G130D polyetherester elastomer using dry blending. Next, the dry-blended mixture was melt-mixed using twin-screw extrusion. To this mixture, $Mg(OH)_2$ was added in an amount sufficient to provide for reaction of 70% of the anionic functional groups of the PRIMACOR, and the mixture was again melt-mixed to produce a polymer alloy, designated Blend 2.1, in which 70% of the anionic functional groups were reacted. Any volatile fraction produced during extrusion was removed from the extruder under vacuum. The process described was repeated using PRIMACOR/SKYPEL weight ratios of 40/60, and 60/40, to produce additional 70% reacted polymer alloys, designated Blend 2.2 and Blend 2.3, respectively.

Also as part of this Example, a blend was prepared comprising 20% by weight of PRIMACOR 5980I copolymer and 80% by weight of SKYPEL G130D polyetherester elastomer using dry blending. Next, the dry-blended mixture was melt-mixed using twin-screw extrusion. This mixture was reextruded using the same extruder. Finally, $Mg(OH)_2$ was added to the mixture in an amount sufficient to provide for reaction of 70% of the anionic functional groups of the PRIMACOR, and the mixture was again melt-mixed to produce a polymer alloy, designated Blend 2.4, in which 70% of the anionic functional groups were reacted. The process incorporating multiple melt-mixing was repeated using PRIMACOR/SKYPEL weight ratios of 40/60, and 60/40, to produce additional 70% reacted polymer alloys, designated Blend 2.5 and Blend 2.6, respectively.

Example 3

This Example incorporates the same blending procedures described in Example 2 above, except that instead of SKYPEL copolymer, HG-252 triblock copolymer is used as Component B. In this Example, 70% reacted alloys were produced after two melt mixes, incorporating 20%, 40%, and 60% HG-252. These blends are designated Blend 3.1, Blend 3.2, and Blend 3.3, respectively. Also, following the procedures discussed above in Example 2, 70% reacted alloys produced after three melt mixes and incorporating 20%, 40%, and 60% HG-252 are designated Blend 3.4, Blend 3.5, and Blend 3.6, respectively.

Example 4

In this Example, the same procedures described in Example 3 above are performed, except that the blend was prepared comprising 40% by weight of PRIMACOR 5980I copolymer and 60% by weight of HG-252 triblock copolymer using dry blending. Next, the dry-blended mixture was melt-mixed using twin-screw extrusion to produce an alloy designated Blend 4.1. $Mg(OH)_2$ was then added to Blend 4.1 in an amount sufficient to provide for reaction of 70% of the anionic functional groups of the PRIMACOR, and the mixture was again melt-mixed to produce a 70% reacted polymer alloy, designated Blend 4.3. Any volatile fraction produced during extrusion was removed from the extrusion apparatus under vacuum. Blend 4.3 was reextruded to produce a 70% reacted polymer alloy designated Blend 4.4.

Also in this Example, Blend 4.1 was reextruded without addition of metal cation to produce a polymer designated Blend 4.2. $Mg(OH)_2$ was then added to Blend 4.4 in an amount sufficient to provide for reaction of 70% of the anionic functional groups of the PRIMACOR, and the mixture was again melt-mixed to produce a 70% reacted polymer alloy, designated Blend 4.5. This mixture was once again melt-mixed to produce a 70% reacted polymer alloy, designated Blend 4.6.

Example 5

In this Example, a larger twin-screw extruder having a different screw configuration from that used for the Examples above was used for blending of the components, to provide for more thorough mixing. Blends comprising varying weight percentages of PRIMACOR 5980I copolymer and HG-252 triblock copolymer were dry-blended. The various blend designations and weight percentages are shown in Table 5 below. During extrusion $Mg(OH)_2$ was added to each of these blends through a side-feeder in an amount sufficient to provide for reaction of 70% of the anionic functional groups of the PRIMACOR to produce the 70% reacted polymer alloys shown in Table 5 below. Any volatile fraction produced during the extrusions was removed from the extruder under vacuum.

Example 6

In this Example, a blend was prepared comprising 60% by weight of PRIMACOR 5980I copolymer and 40% by weight of HG-252 triblock copolymer using dry blending. Next, the dry-blended mixture was melt-mixed using twin-screw extrusion to produce an alloy designated Blend 6.1. During extrusion, $Mg(OH)_2$ was then added through a side-feeder to separate samples of Blend 6.1 in an amount sufficient to provide for reaction of 10% to 70% of the anionic functional groups of the PRIMACOR, in increasing increments of 10%. These mixtures then were melt-mixed for a duration sufficient to produce reaction of the anionic functional groups to the extent of the $Mg(OH)_2$, and they were designated as Blends 6.2 to 6.9 as listed in Table 6 below. Any volatile fraction produced during extrusion was removed from the extruder under vacuum.

Example 7

In this Example, golf balls were prepared incorporating covers made from selected blends prepared above. Specifically, golf balls incorporating blends 3.5, 3.6, 6.6, 6.7, 6.8, and 6.9 were prepared. These balls were designated Types 1 to 6, respectively. The covers made from the selected blends were placed over cores each having a diameter of 1.58 inches, a C.O.R. of 0.793, and a compression of 65.

Results

The various polymer blends produced in Examples 1 to 6 were tested for melt flow index (MFI), hardness, tensile strength, and tensile elongation. The material parameters and tested properties of each of the polymer alloys in Examples 1 to 6 are provided respectively in Tables 1 to 6, below.

TABLE 1

| Blend No. | Primacor wt % | Skypel wt % | Reaction % | MFI g/10 min @ 230° C. | Hardness Shore D | Tensile strength PSI | Tensile elong. % |
|---|---|---|---|---|---|---|---|
| 1.1 | 50 | 50 | 50 | 21.8 | 50 | 1,425 | 89 |
| 1.2 | 50 | 50 | 50 | 24.8 | 49 | 2,559 | 83 |
| 1.3 | 50 | 50 | 50 | 29.0 | 48 | 2,434 | 68 |

TABLE 2

| Blend No. | Primacor wt % | Skypel wt % | Reaction % | MFI g/10 min @ 230° C. | Hardness Shore D | Tensile strength PSI | Tensile elong. % |
|---|---|---|---|---|---|---|---|
| 2.1 | 80 | 20 | 70 | 9.8 | 59 | 3,169 | 62 |
| 2.2 | 60 | 40 | 70 | 9.0 | 50 | 2,089 | 64 |
| 2.3 | 40 | 60 | 70 | 10.0 | 43 | 1,672 | 77 |
| 2.4 | 80 | 20 | 70 | 9.4 | 61 | 2,969 | 112 |
| 2.5 | 60 | 40 | 70 | 12.0 | 49 | 2,391 | 83 |
| 2.6 | 40 | 60 | 70 | 11.5 | 39 | 1,570 | 118 |

TABLE 3

| Blend No. | Primacor wt % | HG-252 wt % | Reaction % | MFI g/10 min @ 230° C. | Hardness Shore D | Tensile strength PSI | Tensile elong. % |
|---|---|---|---|---|---|---|---|
| 3.1 | 80 | 20 | 70 | 3.3 | 59 | 3,499 | 132 |
| 3.2 | 60 | 40 | 70 | 4.9 | 52 | 2,861 | 167 |
| 3.3 | 40 | 60 | 70 | 4.3 | 42 | 2,140 | 202 |
| 3.4 | 80 | 20 | 70 | 5.8 | 55 | 3,396 | 174 |
| 3.5 | 60 | 40 | 70 | 5.7 | 51 | 2,678 | 195 |
| 3.6 | 40 | 60 | 70 | 5.7 | 40 | 1,950 | 250 |

TABLE 4

| Blend No. | Primacor wt % | HG-252 wt % | Reaction % | MFI g/10 min @ 230° C. | Hardness Shore D | Tensile strength PSI | Tensile elong. % |
|---|---|---|---|---|---|---|---|
| 4.1 | 40 | 60 | 0 | 41.4 | N/A | N/A | N/A |
| 4.2 | 40 | 60 | 0 | 36.0 | N/A | N/A | N/A |
| 4.3 | 40 | 60 | 70 | 5.6 | 36 | 2,209 | 284 |
| 4.4 | 40 | 60 | 70 | 4.3 | 43 | 2,441 | 279 |
| 4.5 | 40 | 60 | 70 | 5.8 | 44 | 2,305 | 275 |
| 4.6 | 40 | 60 | 70 | 4.1 | 43 | 2,480 | 288 |

TABLE 5

| Blend No. | Primacor wt % | HG-252 wt % | Reaction % | MFI g/10 min @ 230° C. | Hardness Shore D | Tensile strength PSI | Tensile elong. % | Flex. Mod. PSI |
|---|---|---|---|---|---|---|---|---|
| 5.1 | 80 | 20 | 0 | N/A | 43 | 2,044 | 483 | 4,768 |
| 5.2 | 80 | 20 | 70 | 9.8 | 62 | 5,173 | 513 | 63,584 |
| 5.3 | 70 | 30 | 0 | N/A | 41 | 1,857 | 513 | 4,638 |
| 5.4 | 70 | 30 | 70 | 13.8 | 59 | 4,738 | 289 | 58,968 |
| 5.5 | 60 | 40 | 0 | N/A | 39 | 1,639 | 558 | 3,587 |
| 5.6 | 60 | 40 | 70 | 16.6 | 54 | 4,113 | 355 | 50,068 |
| 5.7 | 50 | 50 | 0 | N/A | 36 | 1,067 | 673 | 3,410 |
| 5.8 | 50 | 50 | 70 | 19.9 | 49 | 3,614 | 445 | 44,731 |
| 5.9 | 40 | 60 | 0 | N/A | 36 | 1,666 | 827 | 4,646 |
| 5.10 | 40 | 60 | 70 | 25.9 | N/A | 2,827 | 614 | 24,845 |

TABLE 6

| Blend No. | Primacor wt % | HG-252 wt % | Reaction % | MFI g/10 min @ 230° C. | Hardness Shore D | Tensile strength PSI | Tensile elong. % | Flex. Mod. PSI |
|---|---|---|---|---|---|---|---|---|
| 6.1 | 60 | 40 | 0 | N/A | 36 | 1,666 | 827 | 4,646 |
| 6.2 | 60 | 40 | 10 | N/A | 42 | 2,156 | 764 | 24,635 |
| 6.3 | 60 | 40 | 20 | N/A | 43 | 2,278 | 796 | 28,912 |
| 6.4 | 60 | 40 | 30 | N/A | 44 | 2,237 | 663 | 32,000 |
| 6.5 | 60 | 40 | 40 | N/A | 45 | 2,443 | 614 | 35,348 |
| 6.6 | 60 | 40 | 50 | 27.7 | 43 | 3,331 | 584 | 40,188 |
| 6.7 | 60 | 40 | 60 | 22.4 | 42 | 3,107 | 570 | 34,350 |
| 6.8 | 60 | 40 | 65 | 26.0 | 44 | 2,900 | 614 | 37,123 |
| 6.9 | 60 | 40 | 70 | 25.9 | 45 | 2,827 | 614 | 24,845 |

Additionally, the balls prepared in Example 7 were tested for ball C.O.R., cover hardness, and driver and 8 Iron speed and spin rate. These tested properties of the balls are provided in Table 7 below.

TABLE 7

| Ball Type | No. 1 | No. 2 | No. 3 | No. 4 | No. 5 | No. 6 |
|---|---|---|---|---|---|---|
| Cover Blend No. | 3.5 | 3.6 | 6.6 | 6.7 | 6.8 | 6.9 |
| Ball C.O.R. | 0.795 | 0.788 | 0.787 | 0.788 | 0.789 | 0.787 |
| Cover Hardness Shore D | 51 | 45 | 49 | 46 | 45 | 46 |
| 8 Iron Speed | 108.8 | 108.9 | 109.1 | 109.5 | 109.3 | 109.0 |
| 8 Iron Spin Rate | 7,591 | 8,719 | 8,356 | 8,382 | 8,371 | 8,416 |
| Driver Speed | 159.3 | 158.2 | 157.6 | 157.6 | 157.5 | 157.5 |
| Driver Spin Rate | 3,188 | 3,616 | 3,488 | 3,456 | 3,422 | 3,488 |

The balls also were tested for shear-cut resistance, determined by examining the balls after they were impacted by a pitching wedge, classifying each numerically from 1 (excellent) to 5 (poor), and averaging the results for a given ball type. In addition, a number of marketed ball types were tested for comparison. The results of this testing are provided in Table 8 below.

TABLE 8

| Ball Type | Shear-cut Resistance | Cover Hardness Shore D |
|---|---|---|
| No. 1 | 2.9 | 51 |
| No. 2 | 1.2 | 45 |
| No. 3 | 2.0 | 49 |
| No. 4 | 2.0 | 46 |
| No. 5 | 1.5 | 45 |
| No. 6 | 1.7 | 46 |
| Callaway CB1 Blue | 3.5 | 54 |
| Wilson True Distance | 3.9 | 57 |
| Titleist NXT Tour | 2.4 | 61 |
| Nike Double C Distance | 3.5 | 61 |
| Callaway CB1 Red | 2.2 | 61 |
| Titleist DT Distance | 2.3 | 63 |
| Titleist NXT Distance | 1.9 | 64 |
| Maxfli Doodle | 1.7 | 64 |
| Taylor Made adidas Golf Distance Plus | 2.2 | 65 |
| Maxfli XS Distance | 2.5 | 67 |
| Strata Professional Distance | 2.2 | 70 |

Discussion

Review of the data from Example 1 indicate that compositions incorporating metal cation sufficient for a 50% reaction have relatively high MFIs, which increased with repeated re-extrusion of the composition. Tensile strength increased after the second extrusion, but seemed to fall slightly after the third. Tensile elongation decreased only slightly after the second extrusion, but fell more dramatically after the third. Hardness did not appear to change with repeated extrusion.

Review of the data from Example 2 indicates that compositions incorporating metal cation sufficient for a 70% reaction (a greater amount than that in Example 1) have substantially lower MFIs than the compositions of Example 1, as expected. This result illustrates that polymer chain mobility decreased with increased reaction percentage of the anionic functional group of Component A in the blend, due to the resulting increasing in pseudo-crosslinking in the blend. These MFIs do not vary substantially with re-extrusion, or by the mix ratios of Component A to B in the compositions. In contrast, hardnesses for these compositions, which are greater than those for the compositions in Example 1, drop substantially with increasing amounts of Component B, to a relatively soft Shore D hardness of 43 or 39 when 60% SKYPEL is used. This decreased hardness indicates that golf ball covers incorporating these compositions likely would provide for good ball feel. Likewise, tensile strengths of these compositions, which are greater than those for the compositions of Example 1, fall substantially with increasing SKYPEL in the composition. Both re-extrusion and mix ratio did not seem to affect tensile elongation in a clear way.

Review of the data from Example 3 indicates similar trends with respect to mix ratio and re-extrusion as seen in Example 3. The exception to this is the clear increase in tensile elongation with increased amounts of the blend material—in this example, HG-252. The compositions generally have lower MFIs and greater tensile strengths and elongations than the comparable compositions in Example 2. The data indicate that use of HG-252 appears to be preferred over use of SKYPEL in the method of the present invention.

Review of the data from Example 4 indicates that without addition of Component C as a source of metal cation for reaction with Component A, compositions having extremely high MFIs are produced. Once metal cation is introduced into the compositions and extrusion is used to produce reaction of the anionic functional groups of Component A with Component C, the MFIs drop dramatically—roughly tenfold. This result illustrates that polymer chain mobility decreases when pseudo-crosslinking from the functional group reaction is produced. The compositions, which incorporate relatively high amounts of HG-252 as Component B, have very low hardness, moderate tensile strength, and extremely high tensile elongation. Re-extrusion after the extrusion with metal cation does not appear to substantially change any of the properties of these compositions.

Review of the data from Example 5 indicates that across a relatively broad range of blend compositions, addition of Component C followed by reaction of Component C with the anionic functional groups of Component A leads to sharp increases in hardness, tensile strength and flexural modulus. The compositions that do not incorporate the reacted anionic groups and resulting pseudo-crosslinked structure have an order of magnitude lower flexural modulus, as well as tensile strength of roughly one-half to one third of the corresponding blends incorporating pseudo-crosslinking. Also, increasing HG-252 content within the psuedo-crosslinked structure of the reaction product of Composition A and Composition C led to increasing MFI, as expected. The material data shown in Table 5 also suggest that compositions produced using methods within the scope of the present invention can possess material characteristics, such as flexural modulus, hardness, and processability having a wide range of values, by varying the amount of Component B in the composition.

Review of the data from Example 6 indicates that increasing the extent of reaction of the anionic functional groups of Component A with Component C, therefore increasing the resulting pseudo-crosslinking, results in generally increasing tensile strength. MFI and hardness do not appear to be consistently altered, and flexural modulus increases with increased reaction up to 50%, past which point flexural modulus begins to decrease. This data illustrates that properties of the resulting polymer blends made using the method of the present invention can be varied in part by adjusting the level of pseudo-crosslinking in the blend structure.

Review of the data from Examples 7 and 8 show that golf balls incorporating covers prepared using the method of the present invention over a variety of blend and reaction percentages can provide for excellent ball properties. In particular, balls incorporating covers prepared using the method of the present invention provide for low cover hardness along with good spin rates and speeds. These balls also provide good to excellent shear-cut resistance in combination with relatively soft covers, in contrast to the generally accepted relationship of increasing shear-cut resistance to increasing ball hardness. Also, the C.O.R. data for the balls show that the ball covers prepared using the method of the present invention are very elastic. For example, the C.O.R. of Ball 1 is higher than that of the core used in the ball. This suggests that the cover blend used for the ball is very elastic, adding speed to the ball, even beyond use of only a core. These cover blends, therefore, address the difficulty of making golf balls that are soft as well as durable, without sacrificing ball speed.

Overall, the data demonstrate that polymer blends using the method of the present invention can have a wide variety of bulk properties important in making a variety of goods. In particular, a wide range of material properties, such as flexibility in adjusting material hardness without sacrificing elastic behavior and durability are important considerations in making golf balls. Factors such as hardness, resilience, processability and durability all can be adjusted as necessary by selection of components, component percentages, functional group type, metal cation, and degree of reaction.

Although the invention has been disclosed in detail with reference only to the preferred methods, those skilled in the art will appreciate that additional methods for making polymer blends can be made without departing from the scope of the invention.

I claim:

1. A method for making a polymer blend composition comprising:
   blending together
   a) at least one component A that is a monomer, oligomer, prepolymer, or polymer comprising at least 5% by weight of anionic functional groups selected from the group consisting of sulfonic acid, phosphoric acid, and carboxylic acid;
   b) at least one component B that is a triblock copolymer comprising less by weight of anionic functional groups than the weight percentage of anionic functional groups of the at least one component A, the triblock copolymer having:
      (i) a first polymer block comprising an aromatic vinyl compound;
      (ii) a second polymer block comprising a diene compound; and
      (iii) a hydroxyl group located at a block copolymer; or a hydrogenation product of the triblock copolymer, or mixtures thereof; and
   c) at least one component C that is a metal cation, to form a first composition, and
   melt-processing the first composition to produce a reaction product of the anionic functional groups of the at least one component A and the at least one component C to form the polymer blend composition.

2. A method as defined in claim 1, wherein the at least one component A blended in the step of blending together comprises between about 5% and about 50% by weight of anionic functional groups.

3. A method as defined in claim 1, wherein the at least one component B blended in the step of blending together comprises less than about 25% by weight of anionic functional groups.

4. A method as defined in claim 3, wherein the at least one component B blended in the step of blending together comprises less than about 20% by weight of anionic functional groups.

5. A method as defined in claim 4, wherein the at least one component B blended in the step of blending together comprises less than about 10% by weight of anionic functional groups.

6. A method as defined in claim 5, wherein the at least one component B blended in the step of blending together is free of anionic functional groups.

7. A method as defined in claim 1, wherein the at least one component A blended in the step of blending together comprises homopolymer, copolymer, terpolymer, or mixtures thereof.

8. A method as defined in claim 7, wherein the at least one component A blended in the step of blending together comprises a copolymer of: (1) an α-olefin having the form $RCH=CH_2$, where R is a radical selected from the class consisting of hydrogen and alkyl radicals having 1 to 8 carbon atoms; and (2) an α-β-ethylenically unsaturated carboxylic acid having preferably 3 to 8 carbon atoms.

9. A method as defined in claim 8, wherein the α-olefin of the copolymer of the at least one component A blended in the step of blending together comprises ethylene, propylene, butene, pentene, hexene, heptene, methylbutene, or methylpentene.

10. A method as defined in claim 8, wherein the α-β-ethylenically unsaturated carboxylic acid of the copolymer of the at least one component A blended in the step of blending together comprises acrylic acid, methacrylic acid, ethacrylic acid, itaconic acid, maleic acid, or fumaric acid.

11. A method as defined in claim 8, wherein the α-β-ethylenically unsaturated carboxylic acid of the copolymer of the at least one component A blended in the step of blending together comprises a monoester of dicarboxylic acid.

12. A method as defined in claim 11, wherein the monoester of dicarboxylic acid of the α-β-ethylenically unsaturated carboxylic acid of the copolymer of the at least one component A blended in the step of blending together is methyl hydrogen maleate, methyl hydrogen fumarate, ethyl hydrogen fumarate, or maleic anhydride.

13. A method as defined in claim 7, wherein the at least one component A blended in the step of blending together comprises a terpolymer of: (1) an α-olefin having the form $RCH=CH_2$, where R is a radical selected from the class consisting of hydrogen and alkyl radicals having 1 to 8 carbon atoms; (2) an α-β-ethylenically unsaturated carboxylic acid having preferably 3 to 8 carbon atoms; and (3) an acrylate ester having from 1 to 21 carbon atoms.

14. A method as defined in claim 1, wherein the at least one component C blended in the step of blending together comprises lithium, sodium, magnesium, aluminum, potassium, calcium, manganese, tungsten, titanium, iron, cobalt, nickel, hafnium, copper, zinc, barium, zirconium, or tin.

15. A method as defined in claim 14, wherein the at least one component C blended in the step of blending together is incorporated into a metal salt.

16. A method as defined in claim 15, wherein the step of blending together comprises metal salt comprises metal hydroxide, metal carbonate, metal acetate, or mixtures thereof.

17. A method as defined in claim 1, wherein the step of blending together comprises blending into the first composition crosslinking agents, co-crosslinking agents, accelerators, activators, ultraviolet-active chemicals, electron beam-active chemicals, colorants, ultraviolet stabilizers, optical brighteners, antioxidants, processing aids, mold release agents, foaming agents, fillers, fibers, or mixtures thereof.

18. A method as defined in claim 1, wherein:
the step of blending together comprises dry-mixing together the at least one component A, the at least one component B, and the at least one component C to form the first composition.

19. A method as defined in claim 18, wherein the step of melt-processing the first composition comprises using an extruder for melt-mixing the first composition.

20. A method as defined in claim 1, wherein the step of melt-processing the first composition comprises melt-mixing the composition more than once.

21. A method as defined in claim 1, wherein the first composition prepared in the step of blending together comprises between about 1% and about 99% by weight of the at least one component A based on the combined weight of component A and component B.

22. A method as defined in claim 21, wherein the first composition prepared in the step of blending together comprises between about 10% and about 90% by weight of the at least one component A based on the combined weight of component A and component B.

23. A method as defined in claim 22, wherein the first composition prepared in the step of blending together comprises between about 20% and about 80% by weight of the at least one component A based on the combined weight of component A and component B.

24. A method as defined in claim 23, wherein the first composition prepared in the step of blending together comprises between about 30% and about 70% by weight of the at least one component A based on the combined weight of component A and component B.

25. A method as defined in claim 1, wherein the step of melt-processing comprises reacting greater than about 5% of the anionic functional groups in the at least one component A with the at least one component C.

26. A method as defined in claim 25, wherein the step of melt-processing comprises reacting between about 10% and about 90% of the functional groups in the at least one component A with the at least one component C.

27. A method as defined in claim 26, wherein the step of melt-processing comprises reacting between about 10% and about 80% of the functional groups in the at least one component A with the at least one component C.

28. A method as defined in claim 27, wherein the step of melt-processing comprises reacting between about 10% and about 70% of the functional groups in the at least one component A with the at least one component C.

29. A sporting good comprising a polymer blend composition prepared using a method as defined in claim 1.

30. A sporting good as defined in claim 29, wherein the sporting good is an athletic shoe, ski, ski boot, snowboard, skate, bicycle, football, hockey mask, hockey club, soccer ball, protective body gear, protective eyewear, golf club, or golf ball.

31. A golf ball comprising a polymer blend composition prepared using a method as defined in claim 1.

32. A golf ball as defined in claim 31, the golf ball comprising a core, the core comprising the polymer blend composition.

33. A golf ball as defined in claim 31, wherein the golf ball comprises a core and a cover encasing the core, the cover comprising the polymer blend composition.

34. A golf ball as defined in claim 31, wherein the golf ball comprises a core, a cover encasing the core, and an intermediate layer situated between the core and the cover, the intermediate layer comprising the polymer blend composition.

35. A golf ball as defined in claim 31, wherein the golf ball comprises a core, the core comprising an inner core and one or more outer cores encasing the inner core.

36. A golf ball as defined in claim 31, wherein the ball comprises a liquid core.

37. A golf ball as defined in claim 31, wherein the ball comprises a core, a cover encasing the core, and a layer of rubber thread situated between the core and the cover.

38. A method for making a polymer blend composition comprising:
blending together
a) at least one component A that is a monomer, oligomer, prepolymer, or polymer comprising at least 5% by weight of anionic functional groups selected from the group consisting of sulfonic acid, phosphoric acid, end carboxylic acid;
b) at least one component B that is a monomer, oligomer, prepolymer, or polymer comprising less by weight of anionic functional groups than the weight percentage of anionic functional groups of the at least one component A; and
c) at least one component C that is a metal cation, to form a first composition, wherein the step of blending together comprises:
dry-mixing together the at least one component A and the at least one component B to produce a first mixture,
melt-mixing the first mixture, and
dry-mixing into die first mixture the at least one component C to form the first composition; and
melt-processing the first composition to produce a reaction product of the anionic functional groups of the at least one component A and the at least one component C to form the polymer blend composition.

39. A method as defined in claim 38, wherein the step of melt-processing the first composition comprises using an extruder for melt-mixing the first composition.

40. A method for making a polymer blend composition comprising:
blending together
a) at least one component A that is a monomer, oligomer, prepolymer, or polymer comprising at least 5% by weight of anionic functional groups selected from the group consisting of sulfonic acid, phosphoric acid, and carboxylic acid;
b) at least one component B that is a monomer, oligomer, prepolymer, or polymer comprising less by weight of anionic functional groups than the weight percentage of anionic functional groups of the at least one component A; and
c) at least one component C that is a metal cation, to form a first composition, wherein the step of blending together comprises:
dry-mixing together the at least one component A and the at least one component B to produce a first mixture,
melt-mixing the first mixture, and
adding into the first mixture the at least one component C to form the first composition; and melt-processing the first composition to produce a reaction product of the anionic functional groups of the at least one component A and the at least one component C to form the polymer blend composition.

41. A method as defined in claim 40, wherein:

the step of melt-mixing the first mixture comprises using an extruder for melt-mixing the first mixture;

the step of adding into the first mixture the at least one component C comprises using a side-feeder coupled to the extruder for adding the at least one component C; and the step of melt-processing the first composition comprises using the extruder for melt-mixing the first composition.

42. A golf ball as defined in claim 31, wherein the polymer blend composition further comprises a copolymer or terpolymer having in its structure a glycidyl, hydroxyl, maleic anhydride, or carboxylic group.

* * * * *

UNITED STATES PATENT AND TRADEMARK OFFICE
CERTIFICATE OF CORRECTION

PATENT NO. : 6,930,150 B2
DATED : August 16, 2005
INVENTOR(S) : Hyun Jin Kim

It is certified that error appears in the above-identified patent and that said Letters Patent is hereby corrected as shown below:

Column 5,
Line 33, "a-p-ethylenically" should be -- α-β-ethylenically --.

Column 10,
Line 16, "funaric" should be -- fumaric --.

Column 24,
Line 24, "end" should be -- and --.
Line 37, "die" should be -- the --.

Signed and Sealed this

Twenty-ninth Day of November, 2005

JON W. DUDAS
*Director of the United States Patent and Trademark Office*